(12) United States Patent
Tamura

(10) Patent No.: US 10,514,839 B2
(45) Date of Patent: Dec. 24, 2019

(54) DISPLAY DEVICE AND DISPLAY CONTROL METHOD

(71) Applicant: KYOCERA Document Solutions Inc., Osaka (JP)

(72) Inventor: Ryota Tamura, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 158 days.

(21) Appl. No.: 15/575,633

(22) PCT Filed: May 19, 2016

(86) PCT No.: PCT/JP2016/064915
§ 371 (c)(1),
(2) Date: Nov. 20, 2017

(87) PCT Pub. No.: WO2016/194636
PCT Pub. Date: Dec. 8, 2016

(65) Prior Publication Data
US 2018/0121048 A1   May 3, 2018

(30) Foreign Application Priority Data

Jun. 5, 2015   (JP) ................................. 2015-115262

(51) Int. Cl.
*G06F 3/0485* (2013.01)
*G06F 3/0482* (2013.01)
*G06F 3/0488* (2013.01)

(52) U.S. Cl.
CPC .......... *G06F 3/0485* (2013.01); *G06F 3/0482* (2013.01); *G06F 3/04883* (2013.01)

(58) Field of Classification Search
CPC .... G06F 3/0482; G06F 3/0485; G06F 3/0488; G06F 3/04883
See application file for complete search history.

(56) References Cited

U.S. PATENT DOCUMENTS

| | | | |
|---|---|---|---|
| 8,532,712 B2 * | 9/2013 | Jang | G06F 3/0485 455/566 |
| 8,762,840 B1 * | 6/2014 | Gouglev | G06F 3/04883 345/173 |
| 9,026,932 B1 * | 5/2015 | Dixon | G06F 3/04883 715/702 |

(Continued)

FOREIGN PATENT DOCUMENTS

JP   2014-074980 A   4/2014

*Primary Examiner* — Andrea N Long
(74) *Attorney, Agent, or Firm* — IP Business Solutions, LLC

(57) ABSTRACT

A display device includes a display section, a gesture acceptance section, and a display control section. The display section has a touch panel function. The gesture acceptance section accepts a scroll gesture on the display section. The display control section allows a target screen image for display to move in a scrolling direction instructed by the scroll gesture and, when the gesture acceptance section accepts the scroll gesture for scrolling toward an end of the target screen image for display in a state where a display area of the target screen image for display being displayed on the display section has reached the end of the target screen image for display, subjects the display area to image processing corresponding to an amount of scroll instructed by the accepted scroll gesture.

11 Claims, 12 Drawing Sheets

(56) References Cited

U.S. PATENT DOCUMENTS

| | | | |
|---|---|---|---|
| 2008/0074399 A1* | 3/2008 | Lee | G06F 3/0482 345/173 |
| 2010/0199180 A1* | 8/2010 | Brichter | G06F 3/0482 715/702 |
| 2011/0090255 A1* | 4/2011 | Wilson | G06F 3/04817 345/647 |
| 2014/0096071 A1 | 4/2014 | Tomita | |
| 2014/0152599 A1* | 6/2014 | Lee | G06F 3/017 345/173 |
| 2016/0202865 A1* | 7/2016 | Dakin | G06F 3/0485 715/784 |

* cited by examiner

| AMOUNT OF SCROLL $S_0$ | IMAGE PROCESSING |
|---|---|
| $S_0 < S_1$ | — |
| $S_1 \leq S_0 < S_2$ | DEFORMATION PROCESSING (SMALL AMOUNT OF DEFORMATION) |
| $S_2 \leq S_0 < S_3$ | DEFORMATION PROCESSING (LARGE AMOUNT OF DEFORMATION) |
| $S_3 \leq S_0$ | DEFORMATION PROCESSING (LARGE AMOUNT OF DEFORMATION) + COLOR CHANGE PROCESSING |

13

HDD

DISPLAY DEVICE AND DISPLAY CONTROL METHOD

TECHNICAL FIELD

The present invention relates to display devices and display control methods and particularly relates to a technique for providing a scrolling display of a target screen image for display.

BACKGROUND ART

Image forming apparatuses, mobile terminals, such as a smartphone, personal computers, and the like each include a display section, such as a liquid crystal display (LCD) or an organic EL (OLED: organic light-emitting diode), and allow the display section to display a target screen image for display.

Because the display section has limited size, it may not be able to display the whole of the target screen image for display at a time. In this case, a partial area (display area) of the target screen image for display is displayed on the display section and, upon acceptance of a user's scroll gesture, the target screen image for display is moved (displayed by scrolling) in a scrolling direction instructed by the scroll gesture (see, for example, Patent Literature 1).

CITATION LIST

Patent Literature

Patent Literature 1: JP-A-2014-74980

SUMMARY OF INVENTION

Technical Problem

When the display area reaches an end of the target screen image for display, the display section does not allow the target screen image for display to move any more even if a scroll gesture is input. When confirming that the target screen image for display does not move in spite of having input a scroll gesture, the user knows that the display area has reached an end of the target screen image for display. However, the above-described content that the display section does not allow the target screen image for display to move any more even if a scroll gesture is input is difficult for the user to recognize as a means for notifying the user that the display area has reached an end of the target screen image for display, and therefore it is user-unfriendly.

The present invention has been made in view of the above circumstances and has an object of enabling a user to be notified in an easily recognizable manner that a display area has reached an end of a target screen image for display.

Solution to Problem

A display device according to an aspect of the present invention is a display device including: a display section having a touch panel function; a gesture acceptance section that accepts a scroll gesture on the display section; and a display control section that allows a target screen image for display to move in a scrolling direction instructed by the scroll gesture and, when the gesture acceptance section accepts the scroll gesture for transiting the target screen image for display further toward an end of the target screen image for display in a state where a display area of the target screen image for display being displayed on the display section has reached the end of the target screen image for display, subjects the display area to image processing corresponding to an amount of scroll instructed by the accepted scroll gesture. The display control section executes, as the image processing, processing for superimposing a predetermined menu screen image on the display area.

Furthermore, a display control method according to another aspect of the present invention is a display control method including: a gesture acceptance step of accepting a scroll gesture on a display section having a touch panel function; and a display control step of allowing a target screen image for display to move in a scrolling direction instructed by the scroll gesture and, when in the gesture acceptance step the scroll gesture for transiting the target screen image for display further toward an end of the target screen image for display is accepted in a state where a display area of the target screen image for display being displayed on the display section has reached the end of the target screen image for display, subjecting the display area to image processing corresponding to an amount of scroll instructed by the accepted scroll gesture. At the display control step, processing for superimposing a predetermined menu screen image on the display area is executed as the image processing.

Advantageous Effects of Invention

The present invention enables a user to be notified in an easily recognizable manner that a display area has reached an end of a target screen image for display.

DESCRIPTION OF EMBODIMENTS

Hereinafter, a description will be given of a display device and a display control method, both according to one embodiment of the present invention, with reference to the drawings.

Embodiment 1

Figure 1:
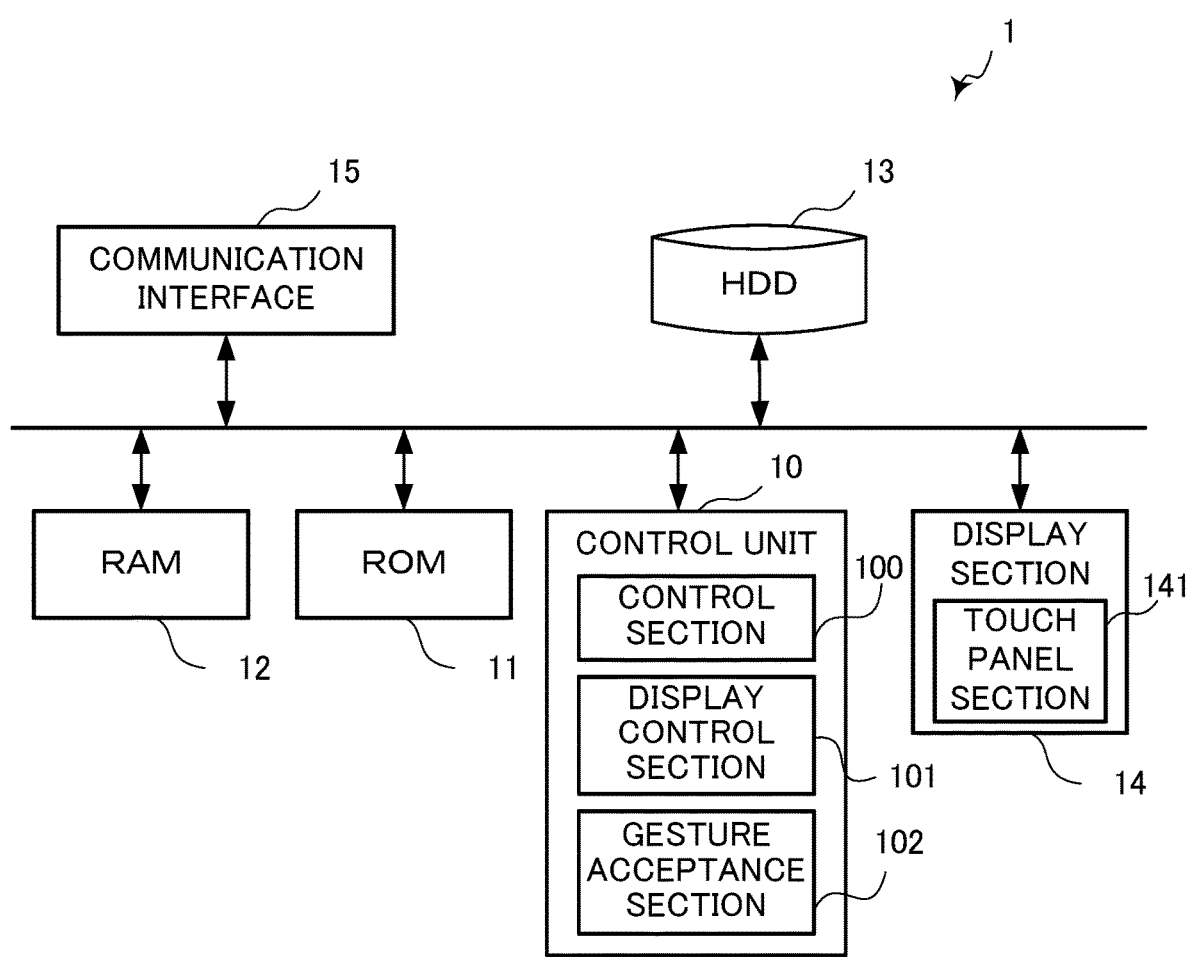
FIG. 1 is a block diagram showing an outline of an internal configuration of a display device according to Embodiment 1 of the present invention.

FIG. 1 is a block diagram showing an outline of an internal configuration of a display device according to Embodiment 1 of the present invention.

The display device according to Embodiment 1 of the present invention is, for example, a mobile terminal, such as a smartphone, and includes a control unit 10, a ROM (read only memory) 11, a RAM (random access memory) 12, an HDD (hard disk drive) 13, a display section 14, and a communication interface 15. These components can transfer data or signals to and from one another via a CPU bus.

The HDD 13 is a large storage device and stores, in a portion of its storage area, image data representing a target screen image for display by the display section 14.

The communication interface 15 serves as an interface for data communication with personal computers and so on connected over a network.

The display section 14 is formed of a liquid crystal display, an organic EL or the like and displays a target screen image for display based on image data stored on the HDD 13 or image data received through the communication interface 15 from an external personal computer or the like.

Furthermore, the display section 14 is provided with a touch panel section 141. The touch panel section 141 detects a user's touch on the display section 14, together with a point of touch (coordinate point). When detecting the user's touch, the touch panel section 141 outputs a detection signal indicating the point of touch to an after-mentioned display control section 101, an after-mentioned gesture acceptance section 102, and so on of the control unit 10. In this manner, the touch panel section 141 serves as a gesture input section through which user's gestures are input from the user.

The touch panel section 141 encompasses a touch panel operable to detect a user's finger or the like when the user's finger or the like, even if not touching the display section 14, comes within a certain distance of the display section 14. Therefore, the term "touch" used in this embodiment includes a state where a finger or the like coming within the certain distance of the display section 14 is detected, without an actual touch on the display section 14, by the function of the touch panel section 141, with the consideration of this state as a substantial touch.

Furthermore, the display device 1 may include physical keys in addition to or in place of the above touch panel section 141. Examples of the physical keys include arrow keys, a Page Up key, and a Page Down key.

The control unit 10 is formed of a CPU (central processing unit) or the like and governs the overall operation of the display device 1. The ROM 11 stores a display control program for controlling operations of the display device 1.

The RAM 12 is used as an operating region of the control unit 10 and for other purposes.

The control unit 10 operates in accordance with the display control program stored in the ROM 11, the HDD 13 or the like to function as a control section 100, a display control section 101, and a gesture acceptance section 102. Alternatively, each of the control section 100, the display control section 101, and gesture acceptance section 102 of the control unit 10 may not be implemented by the operation in accordance with the display control program but may be constituted by a hardware circuit.

The control section 100 governs the overall operation control of the display device 1. For example, the control section 100 uses the communication interface 15 to perform data communication with personal computers and so on connected over a network.

The gesture acceptance section 102 identifies a user's gesture input by a user, based on a detection signal output from the touch panel section 141. Then, the gesture acceptance section 102 accepts the identified user's gesture and outputs a control signal corresponding to the user's gesture to the control section 100, the display control section 101, and so on.

In this relation, user's gestures include a scroll gesture (referred to also as a swipe gesture), a select gesture (referred to also as a tap gesture), and a pinch gesture. For example, when the user slides his/her finger on the display section 14 while keeping it in touch with the display section 10, the touch panel section 141 outputs to the gesture acceptance section 102 detection signals indicating a series of points of movement from an initial point at which the touch has been first detected to a latest position at which the touch is last detected. The gesture acceptance section 102 identifies, based on the detection signals output from the touch panel section 141, a user's gesture input by the user as a scroll gesture. Then, the gesture acceptance section 102 outputs a control signal corresponding to the scroll gesture to the control section 100, the display control section 101, and so on.

The display control section 101 has the function of controlling the display operation of the display section 14 based on a user's gesture accepted by the gesture acceptance section 102. For example, when the gesture acceptance section 102 accepts a scroll gesture, the display control section 101 allows a target screen image for display to be displayed by scrolling according to the scroll gesture.

Figure 2A:
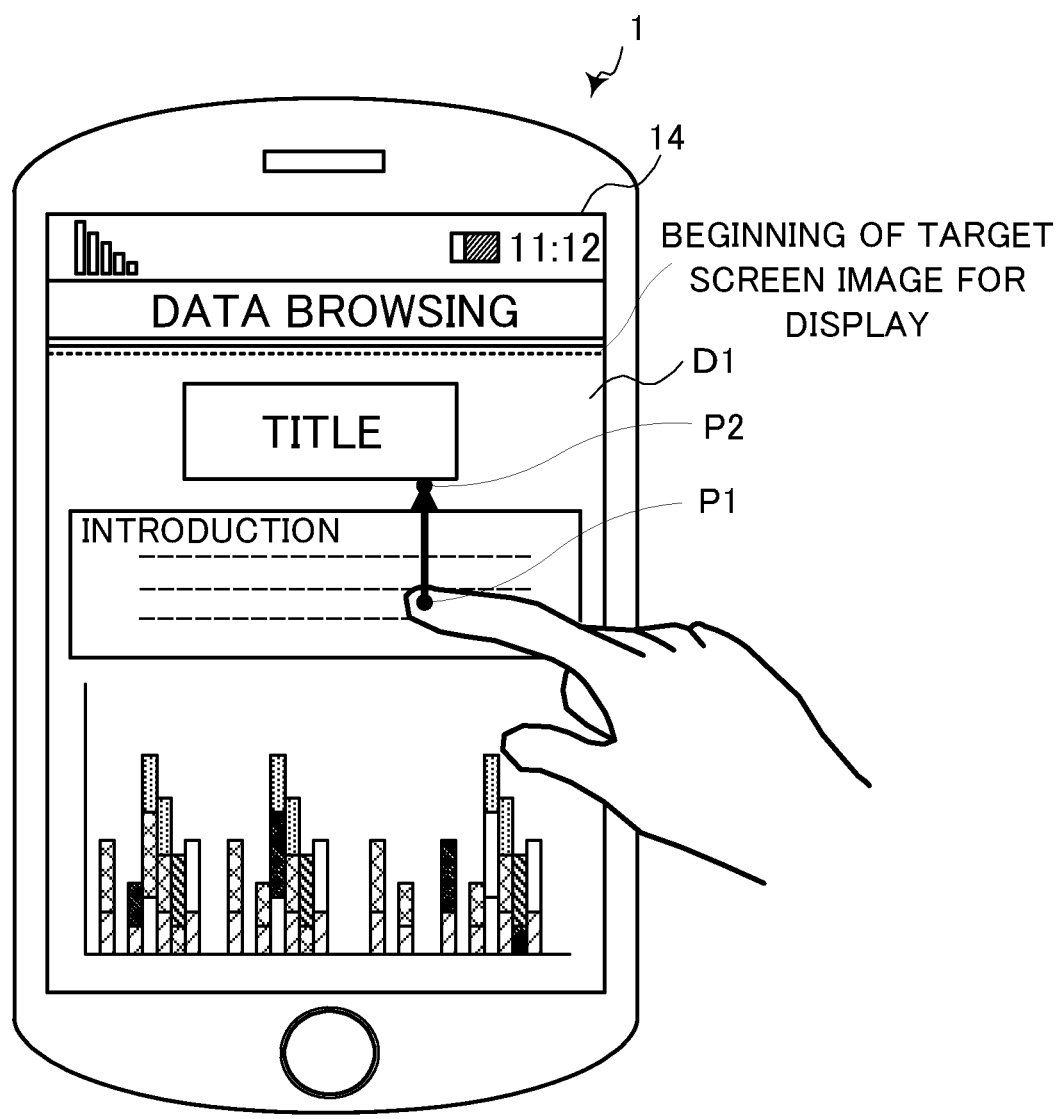
FIG. 2A is a view showing an example of a display area displayed on a display section of the display device according to Embodiment 1 of the present invention.
Figure 2B:
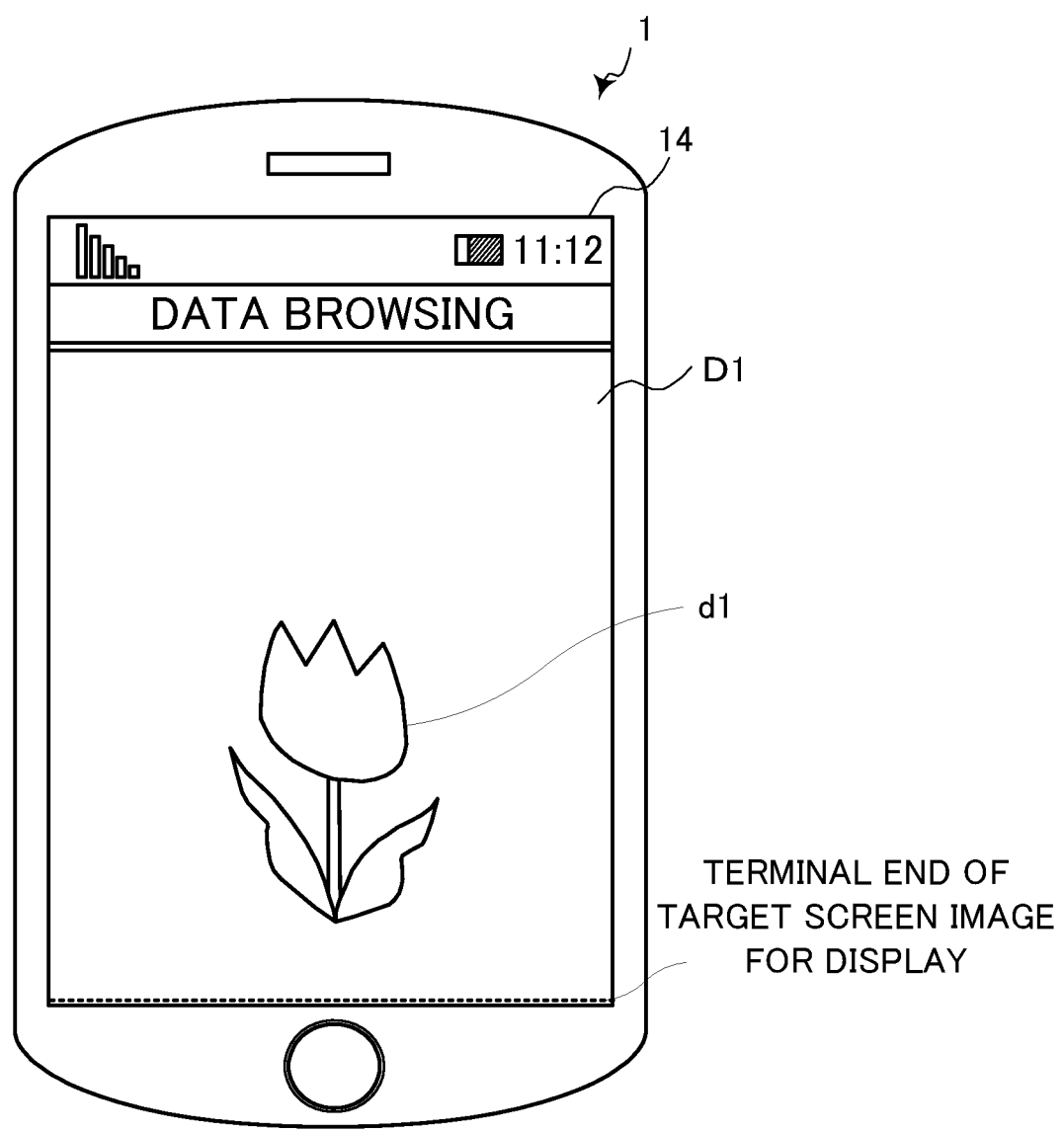
FIG. 2B is a view showing an example of a display area displayed on the display section of the display device according to Embodiment 1 of the present invention.

FIGS. 2A and 2B are views showing examples of a display area displayed on the display section 14. In the example shown in FIG. 2A, a portion of a target screen image for display located at the top thereof is displayed as a display area D1 on the display section 14. Furthermore, in the example shown in FIG. 2A, a finger is slid while keeping in touch with the display section 14 at point P1 and the touch of the finger is removed at point P2 on the display section 14. The display control section 101 moves the target screen image for display, in an upward direction in the plane of the figure which is a scrolling direction, by a length corresponding to an amount of scroll (an amount of movement from point P1 to point P2). As a result of this scrolling display, as shown in FIG. 2B, the display area D1 being displayed on the display section 14 changes. In the example shown in FIG. 2B, the display area D1 has reached a terminal end of the target screen image for display.

Figure 3:
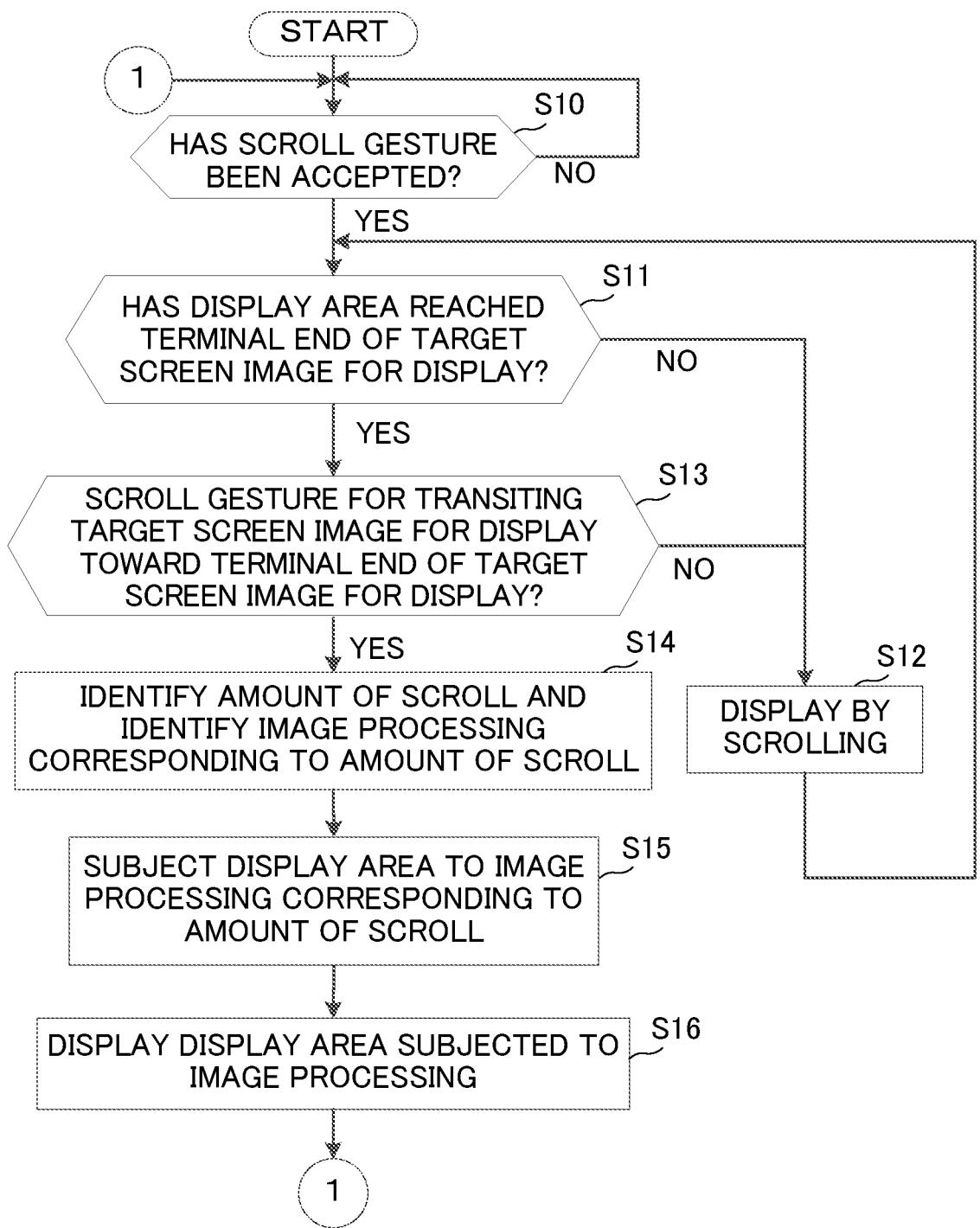
FIG. 3 is a flowchart showing a flow of a scrolling display operation of the display device according to Embodiment 1 of the present invention.

Next, a description will be given of an operation of the display device 1 having the above configuration. FIG. 3 is a flowchart showing a flow of a scrolling display operation of the display device 1.

When the gesture acceptance section 102 accepts a scroll gesture for the display area D1 (YES in step S10), the display control section 101 determines whether or not the display area D1 has reached the terminal end of the target screen image for display (step S11).

When the display area D1 does not reach the terminal end of the target screen image for display (NO in step S11), the display control section 101 moves the target screen image for display in the scrolling direction by a length corresponding to an amount of scroll of the scroll gesture accepted by the gesture acceptance section 102 in the processing of step S10 (step S12).

Furthermore, when the display area D1 has reached the terminal end of the target screen image for display (YES in step S11) but the scroll gesture is not a scroll gesture for transiting the target screen image for display toward the terminal end of the target screen image for display, i.e., the scroll gesture is a scroll gesture for transiting the target screen image for display toward the beginning of the target screen image for display (NO in step S13), the display control section 101 moves the target screen image for display toward the beginning of the target screen image for display (step S12).

On the other hand, when the display area D1 has reached the terminal end of the target screen image for display (YES in step S11) and the scroll gesture is a scroll gesture for transiting the target screen image for display further toward the terminal end of the target screen image for display (YES in step S13), the display control section 101 does not execute the processing of step S12 for providing a scrolling display. In this case, the display control section 101 identifies the amount of scroll of the scroll gesture accepted by the gesture acceptance section 102 in the processing of step S10 and identifies image processing corresponding to the identified amount of scroll (step S14). Then, the display control section 101 subjects the display area D1 to the image processing corresponding to the identified amount of scroll (step S15) and allows the display section 14 to display a display area D1 having been subjected to the image processing (step S16). After the processing of step S16, the process goes back to the processing of step S10.

Figure 4:
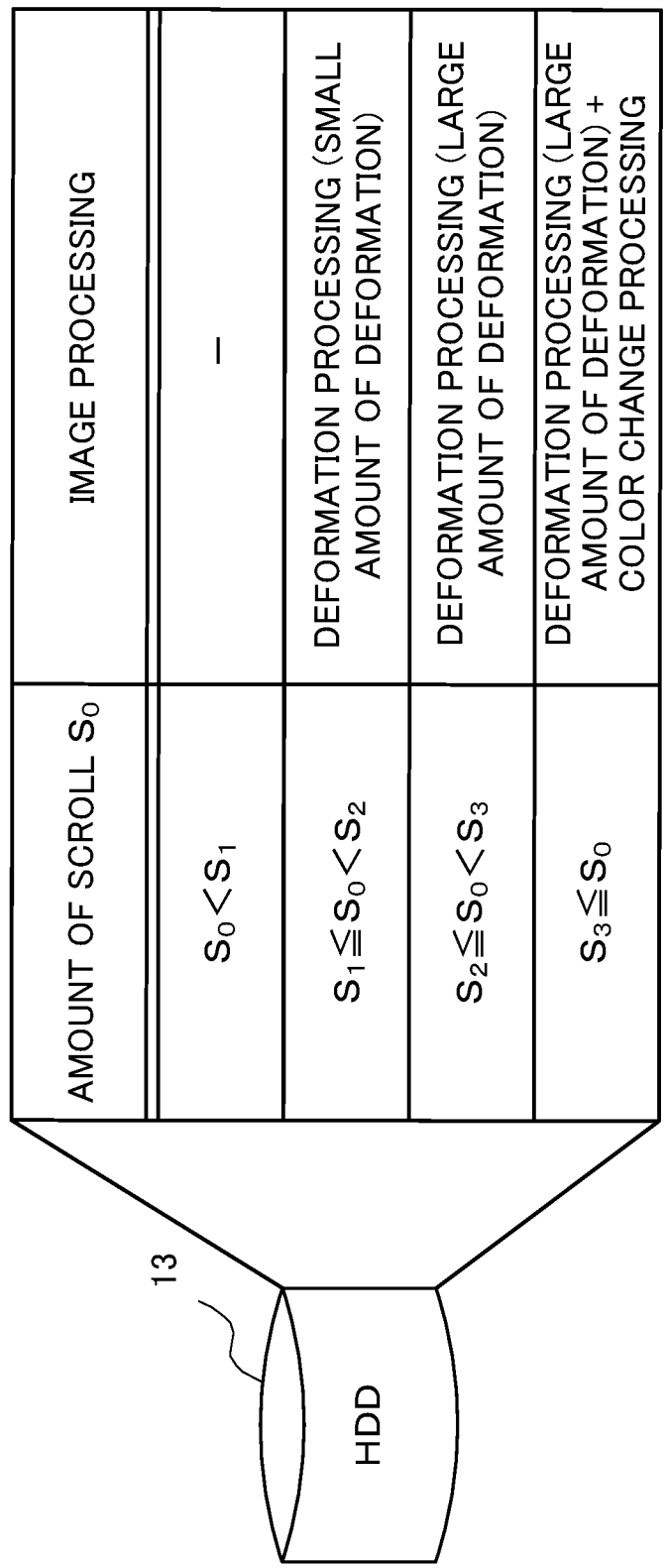
FIG. 4 is a view showing an example of data stored on an HDD of the display device according to Embodiment 1 of the present invention.

FIG. 4 is a view showing an example of data stored on the HDD 13. The HDD 13 previously stores one or more threshold values and different contents of image processing corresponding to different ranges of amounts of scroll specified by the threshold values. In the example shown in FIG. 4, the HDD 13 stores: (1) information indicating that when the amount of scroll $S_0$ is less than a threshold value $S_1$, no image processing is executed; (2) information indicating that when the amount of scroll $S_0$ is equal to or more than the threshold value $S_1$ and less than a threshold value $S_2$, deformation processing (a small amount of deformation) is executed; (3) information indicating that when the amount of scroll $S_0$ is equal to or more than the threshold value $S_2$ and less than a threshold value $S_3$, deformation processing (a large amount of deformation) is executed; and (4) information indicating that when the amount of scroll $S_0$ is equal to or more than the threshold value $S_3$, the deformation processing (the large amount of deformation) and color change processing are executed. The display control section 101 identifies the content of image processing corresponding to the amount of scroll with reference to the above information stored on the HDD 13.

Figure 5A:
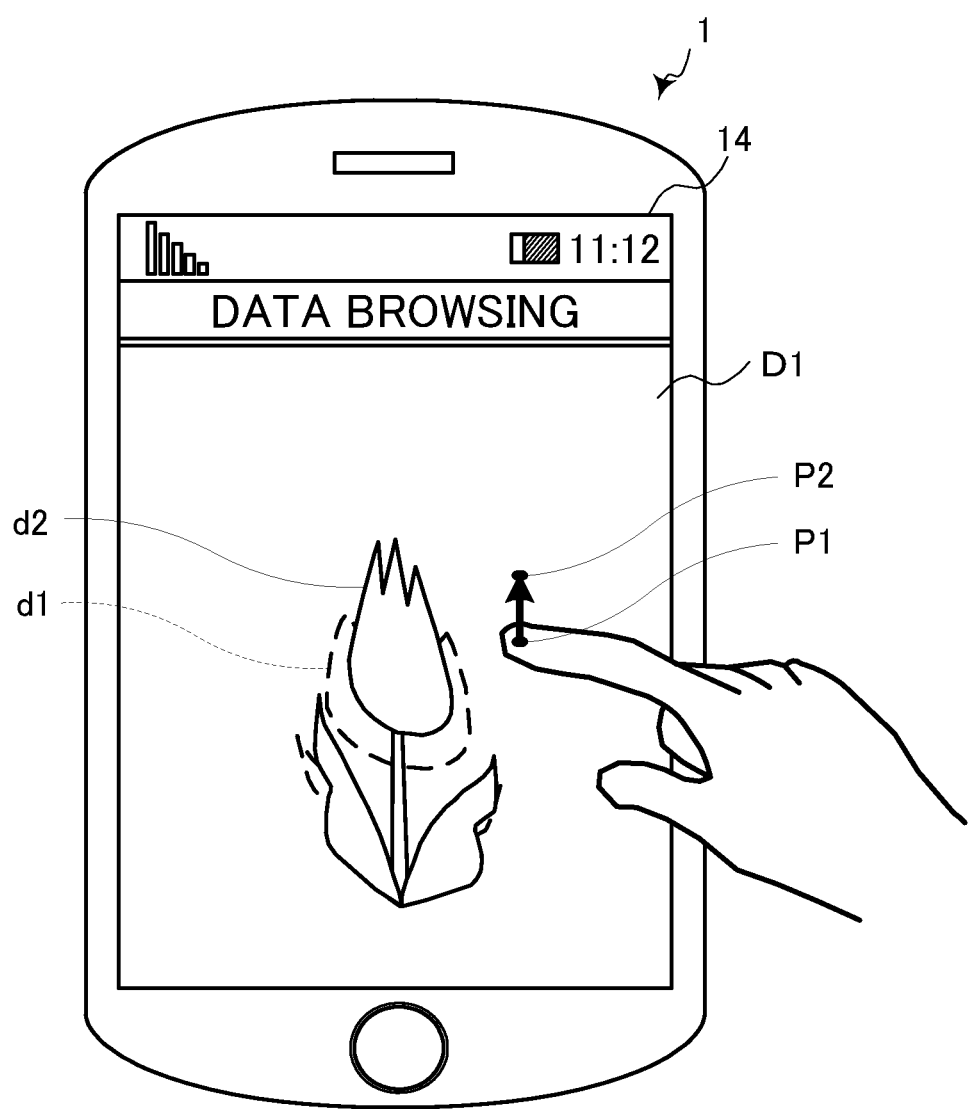
FIG. 5A is a view showing how the display area displayed on the display section of the display device according to Embodiment 1 of the present invention is deformed by deformation processing.
Figure 5B:
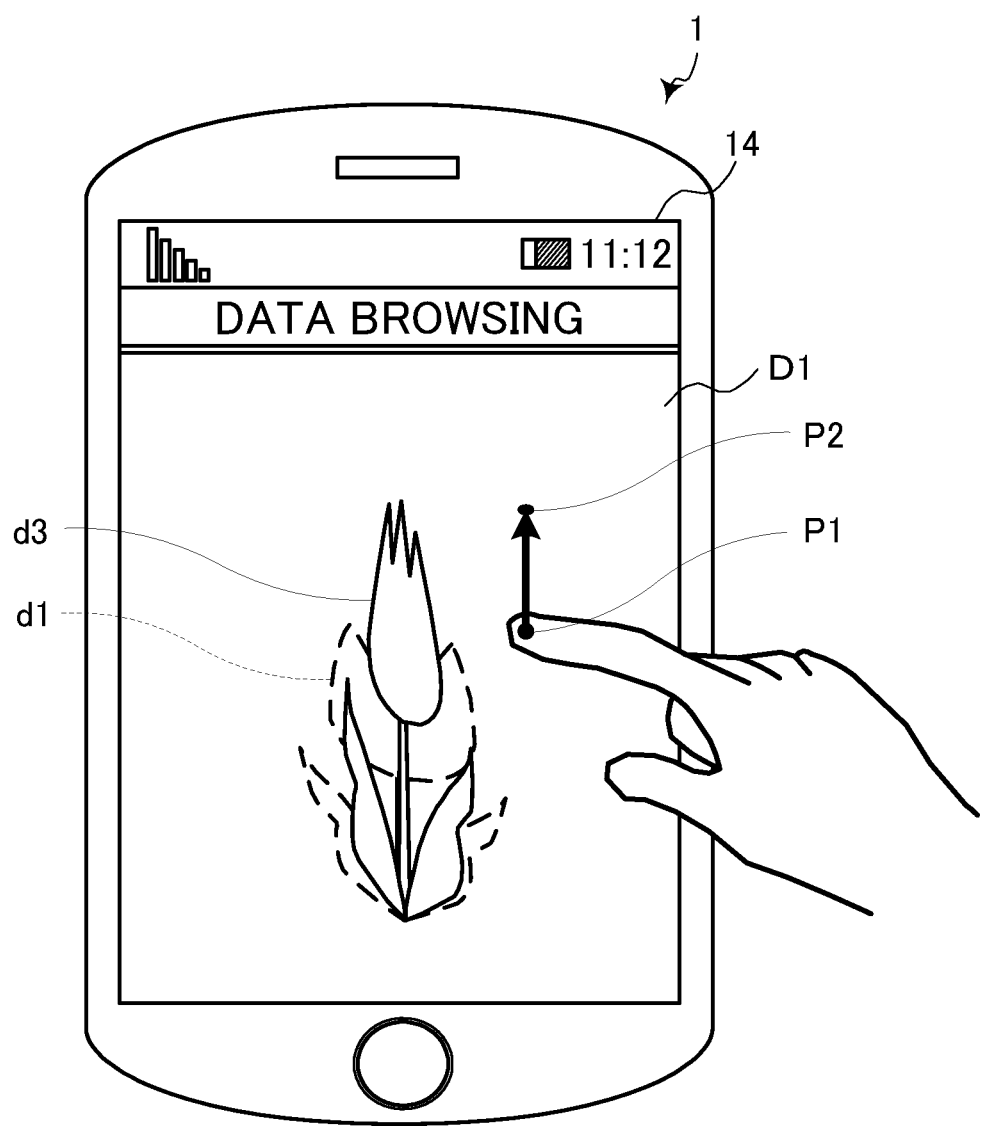
FIG. 5B is a view showing how the display area displayed on the display section of the display device according to Embodiment 1 of the present invention is deformed by the deformation processing.

FIGS. 5A and 5B are views showing how the display area D1 displayed on the display section 14 is deformed by the above deformation processing. When a scroll gesture for transiting the target screen image for display further toward the terminal end of the target screen image for display is made in a state shown in FIG. 2B where the display area D1 has reached the terminal end of the target screen image for display, the display control section 101 subjects the display area D1 to deformation processing. As a result, a flower image d1 represented within the display area D1 is deformed like an image d2 or an image d3. Furthermore, as shown in FIGS. 5A and 5B, the display control section 101 increases the amount of deformation in the deformation processing with increasing amount of scroll (amount of movement from point P1 to point P2).

Figure 6:
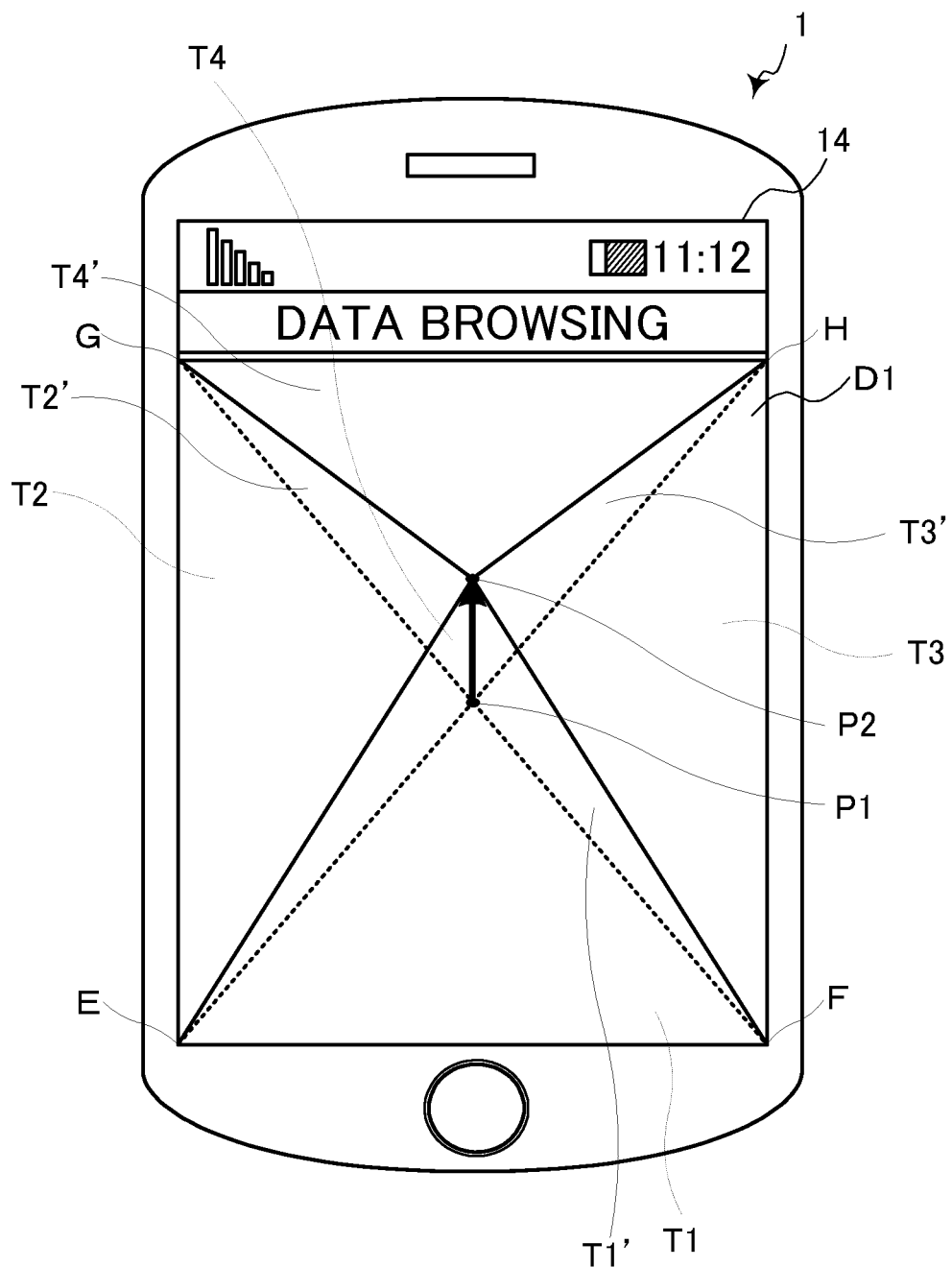
FIG. 6 is a view showing an example of the content of the deformation processing on the display device according to Embodiment 1 of the present invention.

FIG. 6 is a view showing an example of the content of the deformation processing above. The display control section 101 first determines, within the display area D1, a rectangular deformation area to be subjected to the deformation processing. In the example shown in FIG. 6, the display control section 101 determines the whole display area D1 as the deformation area. Then, the display control section 101 divides the deformation area into four triangular regions (T1, T2, T3, T4) by the lines connecting the point of touch (P1) in the scroll gesture and each apex (E, F, G, H) of the deformation area. When the point of touch is moved (P1→P2) by the scroll gesture, the above triangular regions deform (T1', T2', T3', T4'). The display control section 101 deforms, depending on the deformation of each triangular region, the image displayed within the deformation area. For example, the display control section 101 deforms the image displayed within the triangular region T1 depending on the deformation in which the triangular region T1 is deformed to the triangular region T1'. Furthermore, the display control section 101 deforms the image displayed within the triangular region T2 depending on the deformation in which the triangular region T2 is deformed to the triangular region T2'.

The color change processing shown in FIG. 4 above refers to processing for changing the color constituting the display area D1 depending on the amount of scroll. For example, the display control section 101 changes the color constituting the display area D1 from blue to red depending on the amount of scroll. Alternatively, the display control section 101 may change the brightness of the color constituting the display area D1 depending on the amount of scroll.

As thus far described, in the display device 1 according to Embodiment 1, when a scroll gesture for transiting the target screen image for display further toward the terminal end of the target screen image for display is accepted in a state where the display area D1 has reached the terminal end of the target screen image for display, the display area D1 is subjected to image processing corresponding to the amount of scroll instructed by the accepted scroll gesture. Therefore, the user can be notified in an easily recognizable manner that the display area D1 has reached the end of the target screen image for display.

Embodiment 2

Figure 7:
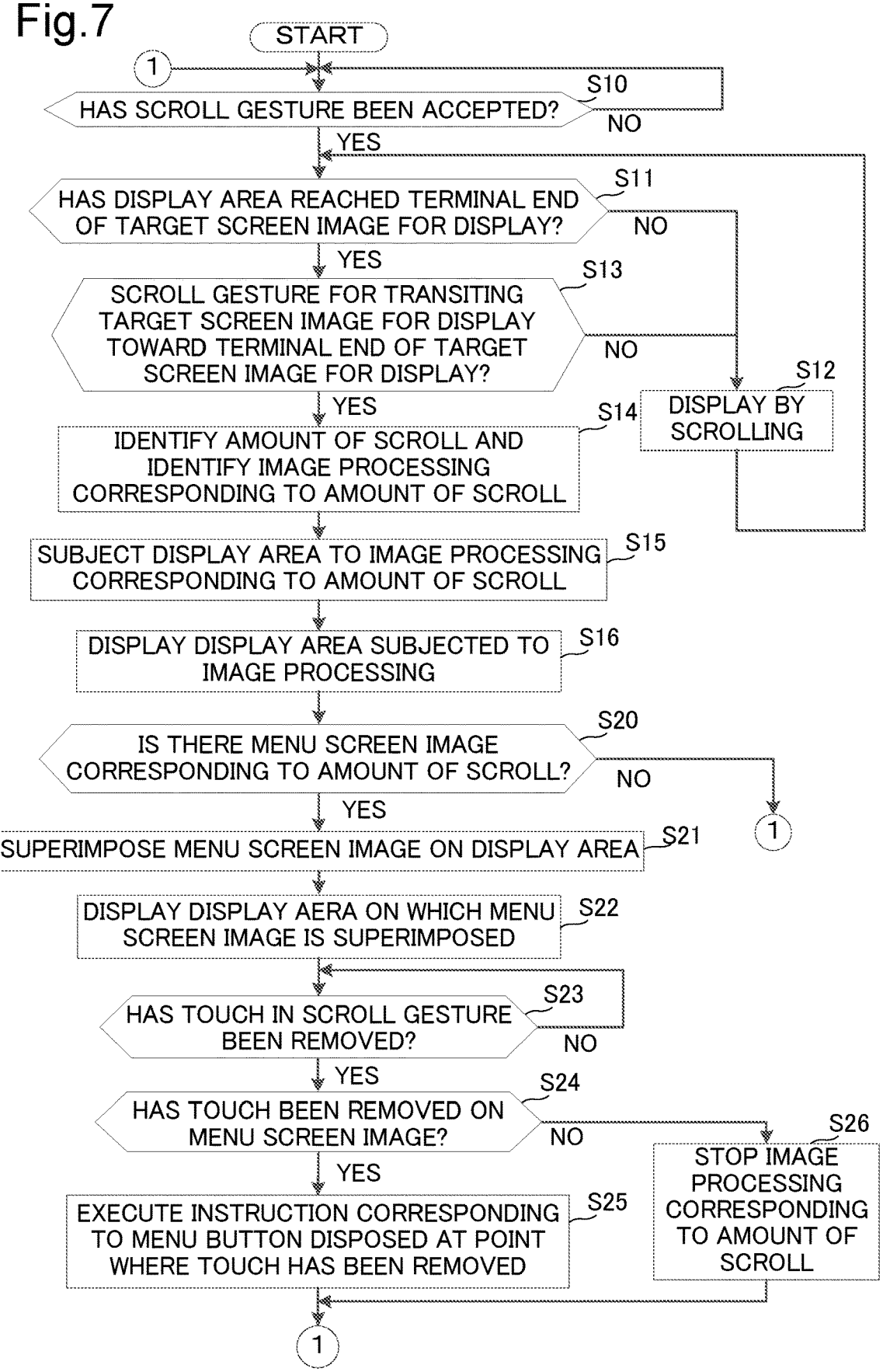
FIG. 7 is a flowchart showing a flow of a scrolling display operation of a display device according to Embodiment 2 of the present invention.

FIG. 7 is a flowchart showing a flow of a scrolling display operation of a display device 1 according to Embodiment 2. The same steps of processing as those described with reference to the flowchart shown in FIG. 3 are designated by the same references and further explanation thereof will be omitted.

In the display device 1 according to Embodiment 2, after the processing of step S16, the display control section 101 determines whether or not there is any menu screen image according to the amount of scroll of the scroll gesture accepted by the gesture acceptance section 102 in the processing of step S10 (step S20).

Figure 8:
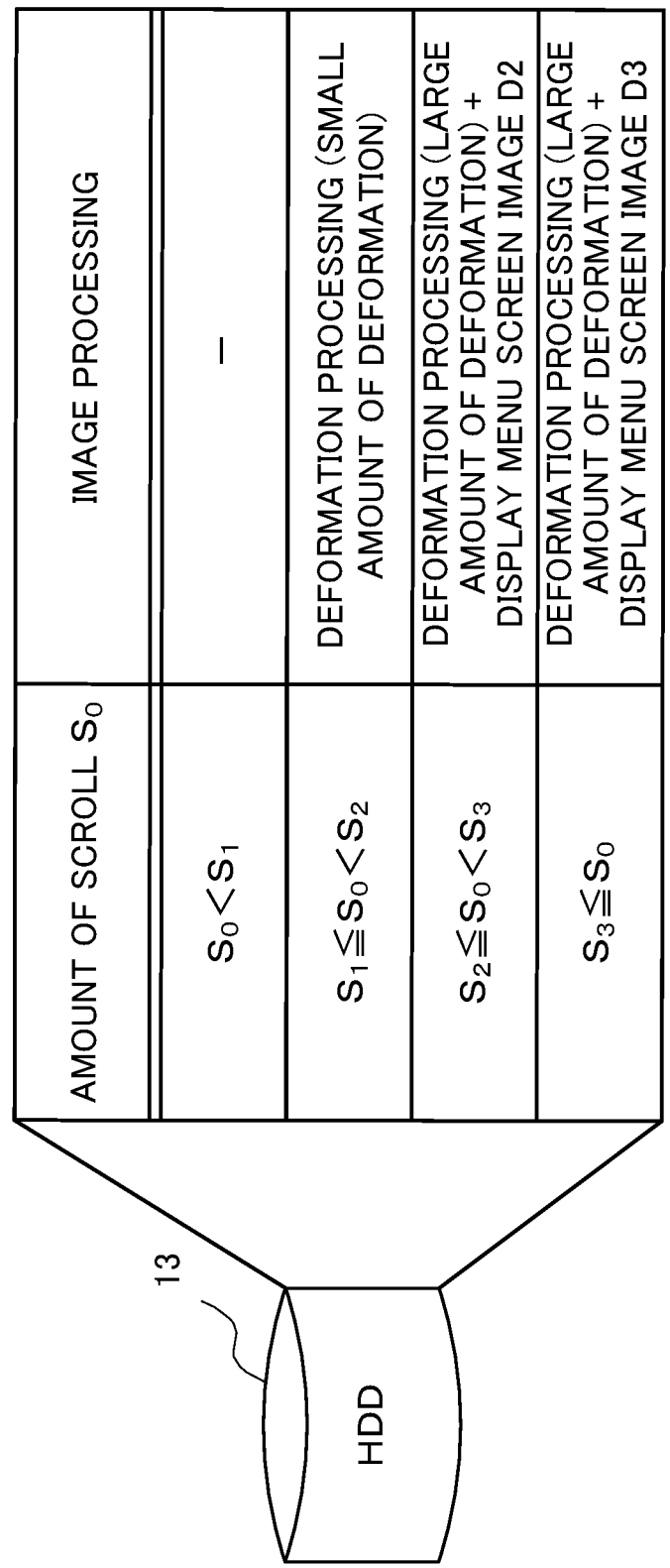
FIG. 8 is a view showing an example of data stored on an HDD of the display device according to Embodiment 2 of the present invention.

FIG. 8 is a view showing an example of data stored on the HDD 13 of the display device 1 according to Embodiment 2. In the example shown in FIG. 8, the HDD 13 stores: information indicating that when the amount of scroll $S_0$ is equal to or more than the threshold value $S_2$ and less than the threshold value $S_3$, the deformation processing and processing for displaying a menu screen image D2 are executed; and information indicating that when the amount of scroll $S_0$ is equal to or more than the threshold value $S_3$, the deformation processing and processing for displaying a menu screen image D3 are executed.

When the display control section 101 determines, with reference to the information stored on the HDD 13, that there is a menu screen image corresponding to the amount of scroll (YES in step S20), the display control section 101 executes processing for superimposing the menu screen image on the display area D1 (step S21) and allows the display section 14 to display the display area D1 on which the menu screen image is superimposed (step S22).

In doing so, when the amount of scroll falls within, of different ranges of amounts of scroll stored on the HDD 13, the range of largest amounts of scroll, the display control section 101 superimposes the menu screen image on a position forward of the point of touch in the scroll gesture in the scrolling direction. Unlike the above, when the amount of scroll does not fall within, of the different ranges of amounts of scroll stored on the HDD 13, the range of largest amounts of scroll, the display control section 101 superimposes the menu screen image on a position located on the opposite side of the point of touch in the scroll gesture to the scrolling direction.

Figure 9A:
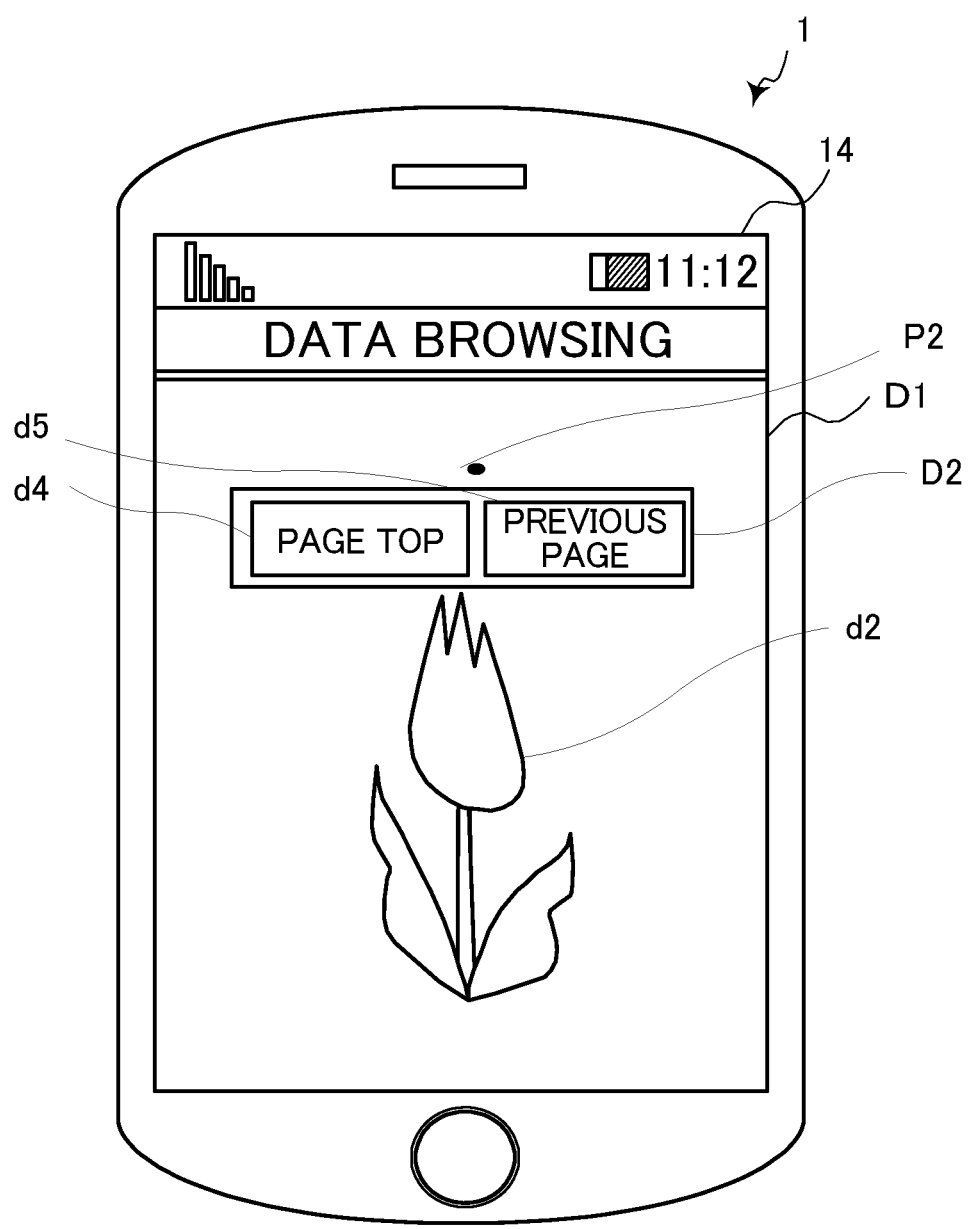
FIG. 9A is a view showing how a menu screen image is superimposed on a display area displayed on a display section of the display device according to Embodiment 2 of the present invention.

An example shown in FIG. 9A shows the display of a menu screen image when the amount of scroll $S_0$ is equal to or more than the threshold value $S_2$ and less than the threshold value $S_3$. In this case, since the amount of scroll $S_0$ does not fall within, of the different ranges of amounts of scroll stored on the HDD 13, the range of largest amounts of scroll, the display control section 101 superimposes the menu screen image D2 on a position located on the opposite side of the point of touch P2 in the scroll gesture to the scrolling direction.

As an example of the menu screen image D2, a menu button d5 for displaying a screen image of a previous page and a menu button d4 for displaying the top of the page shown in FIG. 2A are displayed.

Furthermore, in this case, even if a scroll gesture in a downward direction in FIG. 9A (that is, a scroll gesture for transiting the target screen image for display further toward the beginning of the target screen image for display) is made, the display control section 101 keeps the target screen image for display from being displayed by the scroll gesture for transiting the target screen image for display toward the beginning thereof. Since in this manner the position where the menu screen image D2 is superimposed is determined and a scrolling display toward the beginning of the target screen image for display is forbidden, the user can select any menu button in the menu screen image D2 by moving the finger in the downward direction in FIG. 9A (toward the terminal end of the target screen image for display) without lifting the finger off the display section 14. Moreover, the user can allow the display control section 101 to execute image processing corresponding to the next range of amounts of scroll by moving the finger in an upward direction in FIG. 9A (toward the beginning of the target screen image for display) without lifting the finger off the display section 14.

Figure 9B:
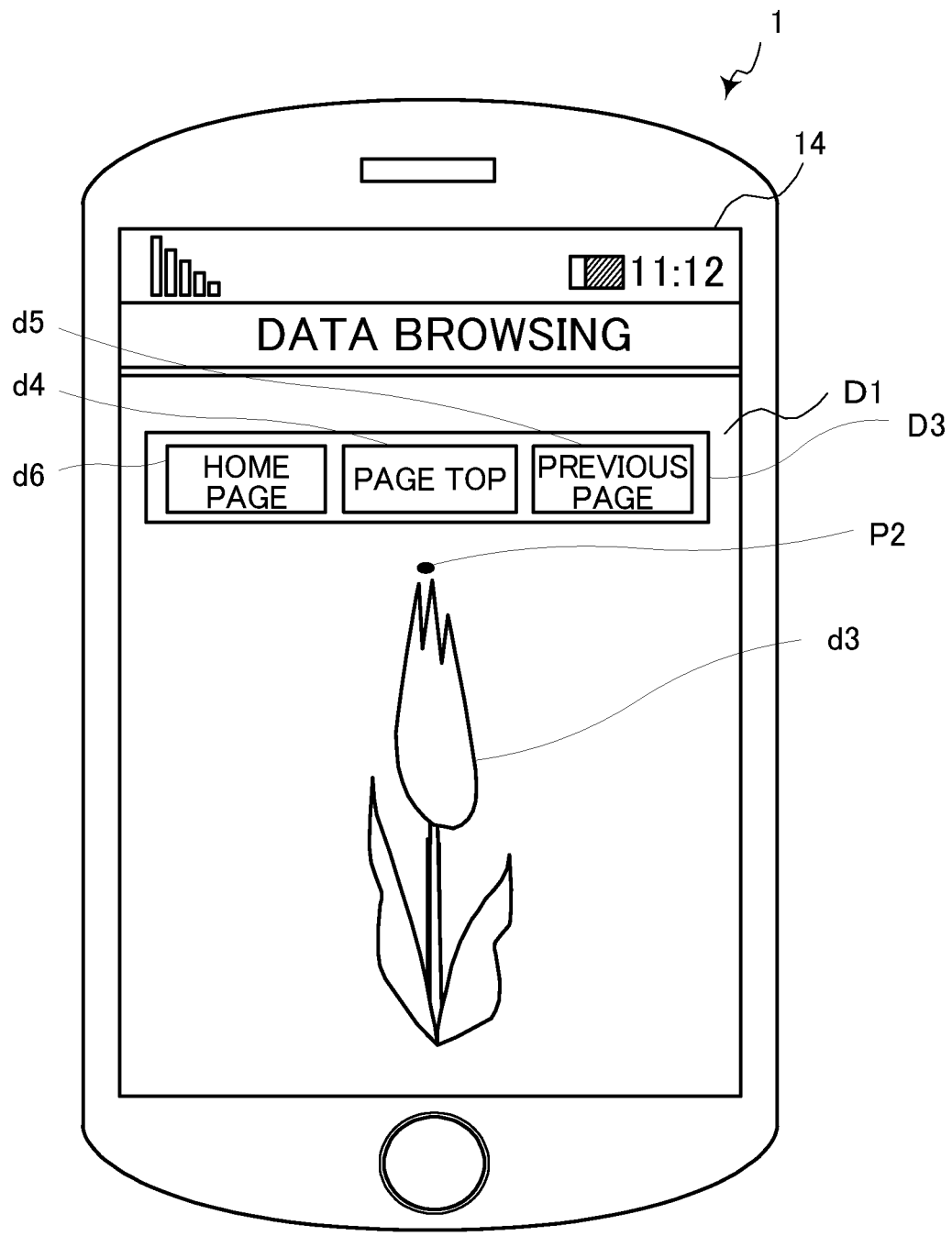
FIG. 9B is a view showing how a menu screen image is superimposed on the display area displayed on the display section of the display device according to Embodiment 2 of the present invention.

An example shown in FIG. 9B shows the display of a menu screen image when the amount of scroll $S_0$ is equal to or more than the threshold value $S_3$. In this case, since the amount of scroll $S_0$ falls within, of the different ranges of amounts of scroll stored on the HDD 13, the range of largest amounts of scroll, the display control section 101 superimposes the menu screen image D3 on a position forward of the point of touch P2 in the scroll gesture in the scrolling direction. As an example of the menu screen image D3, not only the menu button d5 and the menu button d4 are displayed likewise the menu screen image D2, but also a menu button d6 for displaying a screen image of a home page to be displayed when the display device is powered on is displayed.

Since in this manner the position where the menu screen image D3 is superimposed is determined, the user can select any menu button in the menu screen image D3 by moving the finger in the same direction as that of the gesture done until then, that is, the upward direction in FIG. 9A (the direction toward the beginning of the target screen image for display) without lifting the finger off the display section 14. Thus, the user can make smooth switching from a gesture for displaying the menu screen image D3 to a gesture for selecting a menu button.

Referring back to FIG. 7, after the processing of step S22, the gesture acceptance section 102 determines whether or not the touch in the scroll gesture has been removed (step S23). Then, when the point where the touch in the scroll gesture has been removed is on the menu screen image (YES in step S24), the gesture acceptance section 102 accepts an instruction corresponding to a menu button disposed at the point where the touch has been removed (step S25). For example, when the touch in the scroll gesture has been removed on the menu button d4 shown in FIG. 9A, the gesture acceptance section 102 accepts an instruction to display the top of the page. Then, the display control section 102 allows, based on this instruction, the display section 14 to display a display area D1 located at the top of the page.

On the other hand, when the point where the touch in the scroll gesture has been removed is a point other than the menu screen image (NO in step S24), the gesture acceptance section 102 accepts an instruction to stop the image processing corresponding to the amount of scroll (step S26). Then, the display control section 102 stops, based on this instruction, the image processing and allows the display section 14 to display the display area D1 having been displayed before being subjected to the image processing.

The present invention is not limited to the configurations of the above embodiments and can be modified in various ways.

Modification 1

Although in Embodiment 2 above the description has been given of the case where the display control section 101 executes the processing for superimposing the menu screen image D2 or the menu screen image D3 on the display area D1 and the gesture acceptance section 102 accepts an instruction corresponding to the menu button disposed at the point where the touch in the scroll gesture has been removed, the present invention is not necessarily limited to this case.

In the display device 1 according to Modification 1, the display control section 101 does not execute the processing for superimposing the menu screen image D2 or the menu screen image D3 on the display area D1, but the gesture acceptance section 102 accepts an instruction corresponding to a menu button disposed at the menu screen image D2 or the menu screen image D3 in Embodiment 2 above, such as an instruction to display the top of the page or an instruction to display the screen image of the home page, depending on the amount of scroll when the touch in the scroll gesture has been removed.

As just described, in the display device 1 according to Modification 1, the user can input various instructions, such as the instruction to display the top of the page and the instruction to display the screen image of the home page, to the display device 1, even without the display of the menu screen image D2 or the menu screen image D3 on the display section 14, by controlling the point where the touch in the scroll gesture is removed.

Modification 2

Although in Embodiments 1 and 2 above the description has been given of the case where the threshold values stored on the HDD 13 are fixed values, the present invention is not necessarily limited to this case.

In the display device 1 according to Modification 2, the threshold values are changed depending on the length from the point of touch in the scroll gesture to the terminal end of the target screen image for display. For example, when the length from the point of touch in the scroll gesture to the terminal end of the target screen image for display is equal to or more than a predetermined value, the predetermined, fixed threshold values stored on the HDD 13 are used. On the other hand, when the length from the point of touch in the scroll gesture to the terminal end of the target screen image for display is less than the predetermined value, different values depending on the length are used as threshold values.

Modification 3

In Embodiments 1 and 2 above, the description has been given of the case where when the gesture acceptance section 102 accepts a scroll gesture for transiting the target screen image for display further toward the terminal end of the target screen image for display in a state where the display area has reached the terminal end of the target screen image for display, the display control section 101 subjects the display area to image processing corresponding to the amount of scroll. However, in addition to or in place of the above case, when the gesture acceptance section 102 accepts a scroll gesture for transiting the target screen image for display further toward the beginning of the target screen image for display in a state where the display area has reached the beginning of the target screen image for display, the display control section 101 may subject the display area to the image processing corresponding to the amount of scroll.

Furthermore, the display control section 101 may allow the display area to be subjected to different contents of image processing between the case where the gesture acceptance section 102 accepts a scroll gesture for transiting the target screen image for display further toward the beginning of the target screen image for display in a state where the display area has reached the beginning of the target screen image for display and the case where the gesture acceptance section 102 accepts a scroll gesture for transiting the target screen image for display further toward the terminal end of the target screen image for display in a state where the display area has reached the terminal end of the target screen image for display.

For example, when the gesture acceptance section 102 accepts a scroll gesture for transiting the target screen image for display further toward the beginning of the target screen image for display in a state where the display area has reached the beginning of the target screen image for display, the display control section 101 changes the color constituting the display area to a color determined depending on the amount of scroll from among warm colors, including red, yellow, and orange. On the other hand, when the gesture acceptance section 102 accepts a scroll gesture for transiting the target screen image for display further toward the terminal end of the target screen image for display in a state where the display area has reached the terminal end of the target screen image for display, the display control section 101 changes the color constituting the display area to a color determined depending on the amount of scroll from among cold colors, including blue and purple.

Since the display control section 101 executes the above processing, the user can be notified which of the beginning and terminal end of the target screen image for display the display area has reached.

Other Modifications

Although the above embodiments show the display device 1 which is a mobile terminal, such as a smartphone, taken as an example of the display device according to the present invention, the present invention is not necessarily limited to this case. The present invention can be applied to, in addition to a mobile terminal, such as a smartphone, various types of equipment with a display section, such as, for example, a personal computer and an image forming apparatus.

Furthermore, although in the above embodiments the description has been given of the case where an image displayed on the display section 14 is displayed by scrolling by a swipe gesture using a touch panel function, the present invention is not necessarily limited to this case. The image displayed on the display section 14 may be displayed by scrolling by a swipe gesture without using a touch panel function. Examples of such a gesture include a scroll gesture using rotation of a wheel button provided in a mouse or the like and a scroll gesture using selection of a scroll bar.

Alternatively, the above embodiments and modifications may be combined variously.

The invention claimed is:

1. A display device comprising:
a display section having a touch panel function;
a gesture acceptance section that accepts a scroll gesture on the display section; and
a display control section that allows a target screen image for display to move in a scrolling direction instructed by the scroll gesture and, when the gesture acceptance section accepts the scroll gesture for transiting the target screen image for display further toward an end of the target screen image for display in a state where a display area of the target screen image for display being displayed on the display section has reached the end of the target screen image for display, subjects the display area to image processing corresponding to an amount of scroll instructed by the accepted scroll gesture,
wherein the display control section executes, as the image processing, processing for superimposing a predetermined menu screen image on the display area,
the display control section executes, as the image processing, deformation processing for deforming an image represented within the display area and changes an amount of deformation in the deformation processing depending on the amount of scroll, and in executing the deformation processing, the display control section determines a rectangular deformation area to be subjected to the deformation processing within the display area and divides the deformation area into four triangular regions by lines connecting a point of touch in the scroll gesture and each of apexes of the deformation area, and when the point of touch is moved by the scroll gesture to thus deform each of the triangular regions, the display control section deforms the image represented within the deformation area depending on the deformation of each of the triangular regions.

2. The display device according to claim 1, wherein the display control section executes as the image processing, in addition to the deformation processing, processing for changing a color constituting the display area depending on the amount of scroll.

3. The display device according to claim 1, further comprising a storage section that stores a content of the image processing corresponding to a range of the amounts of scroll,
wherein the display control section determines, according to the content of the image processing corresponding to the range of the amounts of scroll stored in the storage section, the image processing to which the display area is to be subjected.

4. The display device according to claim 3, wherein the display control section changes the range of the amounts of scroll depending on a length from the point of touch in the scroll gesture to the end of the target screen image for display.

5. The display device according to claim 1, wherein when the touch in the scroll gesture is removed, the gesture acceptance section accepts an instruction corresponding to the amount of scroll.

6. The display device according to claim 1, wherein when the touch in the scroll gesture is removed on the menu screen image displayed on the display section, the gesture acceptance section accepts an instruction corresponding to a menu button disposed at a point of the menu screen image where the touch has been removed.

7. The display device according to claim 6, wherein
when the touch in the scroll gesture is removed at a point other than the menu screen image displayed on the display section, the gesture acceptance section accepts an instruction to stop the image processing, and
when the gesture acceptance section accepts the instruction to stop the image processing, the display control section stops the image processing and allows the display section to display the display area having been displayed before being subjected to the image processing.

8. A display device comprising:
a display section having a touch panel function;
a gesture acceptance section that accepts a scroll gesture on the display section; and
a display control section that allows a target screen image for display to move in a scrolling direction instructed by the scroll gesture and, when the gesture acceptance section accepts the scroll gesture for transiting the target screen image for display further toward an end of the target screen image for display in a state where a display area of the target screen image for display being displayed on the display section has reached the end of the target screen image for display, subjects the display area to image processing corresponding to an amount of scroll instructed by the accepted scroll gesture,
wherein the display control section executes, as the image processing, processing for superimposing a predetermined menu screen image on the display area, and
the display control section superimposes the menu screen image on a position located on an opposite side of the point of touch in the scroll gesture to the scrolling direction,
the display device further comprising a storage section that stores different contents of the image processing corresponding to different ranges of the amounts of scroll,
wherein when the amount of scroll falls within, of the different ranges of the amounts of scroll stored in the storage section, the range of largest amounts of scroll, the display control section superimposes the menu screen image on a position forward of the point of touch in the scrolling direction, and when the amount of scroll does not fall within, of the different ranges of the amounts of scroll stored in the storage section, the range of largest amounts of scroll, the display control section superimposes the menu screen image on the position located on the opposite side of the point of touch to the scrolling direction.

9. The display device according to claim 1, wherein the display control section allows the display area to be subjected to different contents of the image processing between the case where the gesture acceptance section accepts the scroll gesture for transiting the target screen image for display further toward a beginning of the target screen image for display in a state where the display area has reached the beginning of the target screen image for display and the case where the gesture acceptance section accepts the scroll gesture for transiting the target screen image for display further toward a terminal end of the target screen image for display in a state where the display area has reached the terminal end of the target screen image for display.

10. A display control method comprising:
a gesture acceptance step of accepting a scroll gesture on a display section having a touch panel function; and
a display control step of allowing a target screen image for display to move in a scrolling direction instructed by the scroll gesture and, when in the gesture acceptance step the scroll gesture for transiting the target screen image for display further toward an end of the target screen image for display is accepted in a state where a display area of the target screen image for display being displayed on the display section has reached the end of the target screen image for display, subjecting the display area to image processing corresponding to an amount of scroll instructed by the accepted scroll gesture,
wherein at the display control step, processing for superimposing a predetermined menu screen image on the display area is executed as the image processing,
at the display control step, deformation processing for deforming an image represented within the display area is executed as the image processing, and an amount of deformation in the deformation processing is changed depending on the amount of scroll, and
at the display control step, in executing the deformation processing, a rectangular deformation area to be subjected to the deformation processing within the display area is determined and the deformation area is divided into four triangular regions by lines connecting a point of touch in the scroll gesture and each of apexes of the deformation area, and when the point of touch is moved by the scroll gesture to thus deform each of the triangular regions, the image represented within the deformation area is deformed depending on the deformation of each of the triangular regions.

11. A display control method comprising:

a gesture acceptance step of accepting a scroll gesture on a display section having a touch panel function; and a display control step of allowing a target screen image for display to move in a scrolling direction instructed by the scroll gesture and, when in the gesture acceptance step the scroll gesture for transiting the target screen image for display further toward an end of the target screen image for display is accepted in a state where a display area of the target screen image for display being displayed on the display section has reached the end of the target screen image for display, subjecting the display area to image processing corresponding to an amount of scroll instructed by the accepted scroll gesture, wherein at the display control step, processing for superimposing a predetermined menu screen image on the display area is executed as the image processing, at the display control step, superimposing the menu screen image on a position located on an opposite side of the point of touch in the scroll gesture to the scrolling direction, and at the display control step, when the amount of scroll falls within, of different ranges of the amounts of scroll stored in a storage section that stores different contents of the image processing corresponding to the different ranges of the amounts of scroll, the range of largest amounts of scroll, superimposing the menu screen image on a position forward of the point of touch in the scrolling direction, and when the amount of scroll does not fall within, of the different ranges of the amounts of scroll stored in the storage section, the range of largest amounts of scroll, superimposing the menu screen image on the position located on the opposite side of the point of touch to the scrolling direction.

* * * * *